(12) United States Patent
Watanabe

(10) Patent No.: US 11,302,076 B2
(45) Date of Patent: Apr. 12, 2022

(54) PERIPHERY MONITORING APPARATUS

(71) Applicant: AISIN CORPORATION, Kariya (JP)

(72) Inventor: Kazuya Watanabe, Anjo (JP)

(73) Assignee: AISIN CORPORATION, Kariya (JP)

( * ) Notice: Subject to any disclaimer, the term of this patent is extended or adjusted under 35 U.S.C. 154(b) by 416 days.

(21) Appl. No.: 16/338,886

(22) PCT Filed: Sep. 1, 2017

(86) PCT No.: PCT/JP2017/031652
§ 371 (c)(1),
(2) Date: Apr. 2, 2019

(87) PCT Pub. No.: WO2018/066282
PCT Pub. Date: Apr. 12, 2018

(65) Prior Publication Data
US 2021/0279959 A1 Sep. 9, 2021

(30) Foreign Application Priority Data
Oct. 4, 2016 (JP) .............................. JP2016-196357

(51) Int. Cl.
*G06T 19/00* (2011.01)
*G06T 7/70* (2017.01)
*B60R 1/00* (2022.01)

(52) U.S. Cl.
CPC .......... *G06T 19/003* (2013.01); *B60R 1/002* (2013.01); *G06T 7/70* (2017.01); *B60R 2300/602* (2013.01);
(Continued)

(58) Field of Classification Search
CPC ................ B60R 1/00; B60R 2300/607; B60R 2300/303; B60R 2300/605;
(Continued)

(56) References Cited

U.S. PATENT DOCUMENTS

2009/0122140 A1* 5/2009 Imamura ................ B60Q 9/005
348/148
2012/0069187 A1 3/2012 Ozaki et al.
(Continued)

FOREIGN PATENT DOCUMENTS

CN 102448773 A 5/2012
CN 103692973 A 4/2014
(Continued)

OTHER PUBLICATIONS

The Extended European Search Report dated Jul. 3, 2019, issued by the European Patent Office in corresponding application No. 17858121.1.

(Continued)

*Primary Examiner* — Nathnael Aynalem
(74) *Attorney, Agent, or Firm* — Sughrue Mion, PLLC

(57) ABSTRACT

A periphery monitoring apparatus includes: an image capturing unit configured to generate a captured image by capturing a periphery of a mobile body; and a controller configured to generate, from the captured image, a peripheral image representing a view from a virtual viewpoint that is set at a relative position to a current position of the mobile body depending on a movement of the mobile body, generate a display image in which a mobile body image representing a position of the mobile body is superimposed on the peripheral image, and display the mobile body image to fix a position of the mobile body image in the display image.

12 Claims, 9 Drawing Sheets

(52) U.S. Cl.
CPC ............... *G06T 2207/30252* (2013.01); *G06T 2219/028* (2013.01)

(58) Field of Classification Search
CPC ........ B60R 2300/102; B60R 2300/105; B60R 2300/308; B60R 2300/307; B60R 1/002; B60R 2300/602; B60R 2300/806; G06T 19/003; G06T 19/006; G06T 2207/30252; G06T 1/00; G06T 7/70; G06T 3/00; G06T 19/00; G06T 2207/30248; H04N 5/23238
USPC .......................................................... 348/148
See application file for complete search history.

(56) References Cited

U.S. PATENT DOCUMENTS

| | | | | |
|---|---|---|---|---|
| 2013/0141547 | A1* | 6/2013 | Shimizu | ................ H04N 7/181 348/48 |
| 2014/0085466 | A1 | 3/2014 | Moriyama et al. | |
| 2014/0118341 | A1* | 5/2014 | Shimizu | ................ G06T 3/4038 345/419 |
| 2014/0139640 | A1* | 5/2014 | Shimizu | ............. G06K 9/00791 348/46 |
| 2016/0001704 | A1 | 1/2016 | Nakasho et al. | |
| 2018/0201191 | A1 | 7/2018 | Nakasho et al. | |

FOREIGN PATENT DOCUMENTS

| | | |
|---|---|---|
| JP | 2012-138660 A | 7/2012 |
| JP | 2012-195793 A | 10/2012 |
| JP | 2014-134912 A | 7/2014 |
| JP | 2015-184839 A | 10/2015 |
| WO | 2014/156220 A1 | 10/2014 |

OTHER PUBLICATIONS

International Search Report of PCT/JP2017/031652 dated Nov. 21, 2017.

* cited by examiner

PERIPHERY MONITORING APPARATUS

CROSS-REFERENCE TO RELATED APPLICATIONS

This application is a National Stage of International Application No. PCT/JP2017/031652 filed Sep. 1, 2017, claiming priority based on Japanese Patent Application No. 2016-196357 filed Oct. 4, 2016, the contents of all of which are incorporated herein by reference in their entirety.

TECHNICAL FIELD

The present invention relates to a periphery monitoring apparatus.

BACKGROUND ART

There is known a periphery monitoring apparatus that displays a display image in which an image of a mobile body, such as a vehicle, is combined with a peripheral image of the mobile body generated from a captured image. Such a periphery monitoring apparatus displays a display image in which the image of the mobile body moves along with a movement of the mobile body in a peripheral image generated from a single captured image.

CITATION LIST

Patent Literature

Patent Document 1: WO 2014/156220

SUMMARY OF INVENTION

Problem to be Solved by the Invention

However, since the above-described periphery monitoring apparatus causes the image of the mobile body to move in the display image, there has been a problem in that it is hard for occupants to watch the display image.

The present invention has been made in view of the above, and provides a periphery monitoring apparatus that is capable of displaying a display image easy for the occupants to watch.

Means for Solving Problem

For solving the above problem, a periphery monitoring apparatus includes: an image capturing unit configured to generate a captured image by capturing a periphery of a mobile body; and a controller configured to generate, from the captured image, a peripheral image representing a view from a virtual viewpoint that is set at a relative position to a current position of the mobile body depending on a movement of the mobile body, generate a display image in which a mobile body image representing a position of the mobile body is superimposed on the peripheral image, and display the mobile body image to fix a position of the mobile body image in the display image.

Since the periphery monitoring apparatus fixes the position of the mobile body image in the display image, it is possible to display the display image easy for the occupant to watch.

In the periphery monitoring apparatus according to the present invention, the controller may generate, as the peripheral image, an image representing a view of the captured image from the virtual point, the captured image being projected onto a three-dimensional virtual projection plane including a first virtual plane and a second virtual plane intersecting with the first virtual plane. As a result, in comparison with the case where the peripheral image is generated from a captured image projected onto a two-dimensional virtual projection plane, the periphery monitoring apparatus can suppress the extension of the image of an object extending in the vertical direction (for example, a utility pole) in the periphery of the mobile body and generate a peripheral image that is easy for the occupant to watch.

In the periphery monitoring apparatus according to the present invention, the controller may move the virtual viewpoint in accordance with an input from a user. As a result, the periphery monitoring apparatus can provide a display image including a peripheral image representing a view from a virtual viewpoint desired by the user.

The periphery monitoring apparatus according to the present invention further includes a storage unit configured to store a three-dimensional mobile body shape model that is a three-dimensional shape model of the mobile body. In the periphery monitoring apparatus, the mobile body image may be generated from the three-dimensional mobile body shape model stored in advance in the storage unit. By superimposing a three-dimensional mobile body image, the periphery monitoring apparatus can provide a display image that is more easily to watch.

BRIEF DESCRIPTION OF DRAWINGS

FIG. 1 is an exemplary perspective view illustrating a state where a part of a passenger compartment of a vehicle according to a first embodiment is seen through.

DESCRIPTION OF EMBODIMENTS

In the following exemplary embodiments and the like, the same constituent elements are denoted by common reference signs and the redundant explanations thereof are omitted as appropriate.

First Embodiment

Figure 1:
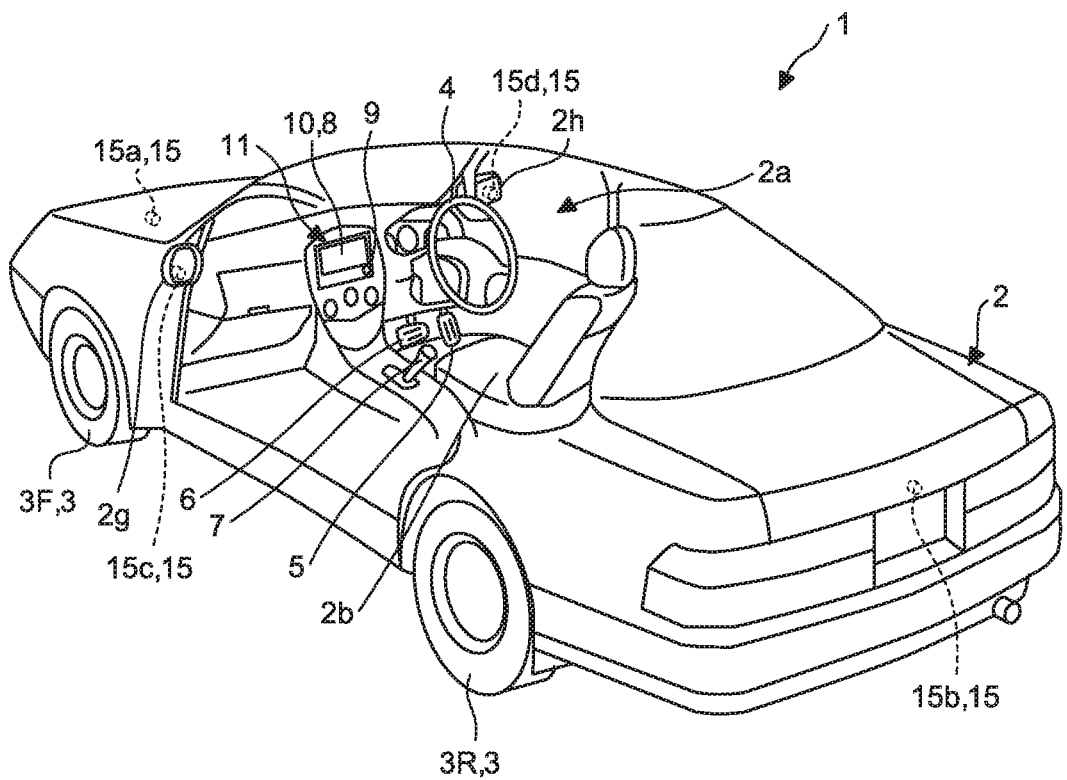

FIG. 1 is an exemplary perspective view illustrating a state where a part of a passenger compartment 2a of a vehicle 1 according to a first embodiment is seen through. The vehicle 1 may be, for example, an automobile with an internal combustion engine (an engine, not illustrated) as a drive source (an internal-combustion engine vehicle), an automobile with an electric motor (a motor, not illustrated) as a drive source (an electric vehicle, a fuel-cell vehicle, or the like), or an automobile with both of the foregoing as a drive source (a hybrid vehicle). The vehicle 1 can be equipped with various types of transmissions and various devices (systems, components, and others) that are needed to drive the internal combustion engine or the electric motor. The method, the number, the layout, and others of the devices concerning the drive of wheels 3 in the vehicle 1 can be set in various ways.

As illustrated in FIG. 1, the vehicle 1 includes a vehicle body 2, a steering unit 4, an acceleration operating unit 5, a braking operating unit 6, a speed-change operating unit 7, and a monitor device 11.

The vehicle body 2 constitutes the passenger compartment 2a in which occupants not illustrated ride in. In the passenger compartment 2a, the steering unit 4, the acceleration operating unit 5, the braking operating unit 6, the speed-change operating unit 7, a display device 8, a sound output device 9, an operation input unit 10, and the like are provided to face a seat 2b for a driver as an occupant. The vehicle body 2 includes a front bumper provided at the lower portion of the front end portion and a rear bumper provided at the lower portion of the rear end portion.

The steering unit 4 is a steering wheel projecting from a dashboard, for example. The acceleration operating unit 5 is an accelerator pedal positioned under the foot of the driver, for example. The braking operating unit 6 is a brake pedal positioned under the foot of the driver, for example. The speed-change operating unit 7 is a shift lever projecting from a center console, for example. The steering unit 4, the acceleration operating unit 5, the braking operating unit 6, and the speed-change operating unit 7 are not limited to the above.

The monitor device 11 is provided in a central portion in a vehicle width direction of the dashboard, that is, a left-and-right direction of the dashboard, for example. The monitor device 11 may have a function such as a navigation system or an audio system. The monitor device 11 includes the display device 8, the sound output device 9, and the operation input unit 10. The monitor device 11 may include an operation input unit, which is not illustrated, such as a switch, a dial, a joystick, and a push button.

The display device 8 displays an image on the basis of image information. The display device 8 is a liquid crystal display (LCD), or an organic electroluminescent display (OELD), for example.

The sound output device 9 outputs sound on the basis of audio data. The sound output device 9 is a speaker, for example. The sound output device 9 may be provided at a position in the passenger compartment 2a other than the monitor device 11.

The operation input unit 10 receives an input of the occupant. The operation input unit 10 is a touch panel, for example. The operation input unit 10 is provided on a display screen of the display device 8. The operation input unit 10 is configured such that an image displayed by the display device 8 can be transmitted through it. Accordingly, the operation input unit 10 enables the occupant to visually recognize the image displayed on the display screen of the display device 8. The operation input unit 10 receives an instruction that is input by touching a position corresponding to the image displayed on the display screen of the display device 8 by the occupant.

Figure 2:
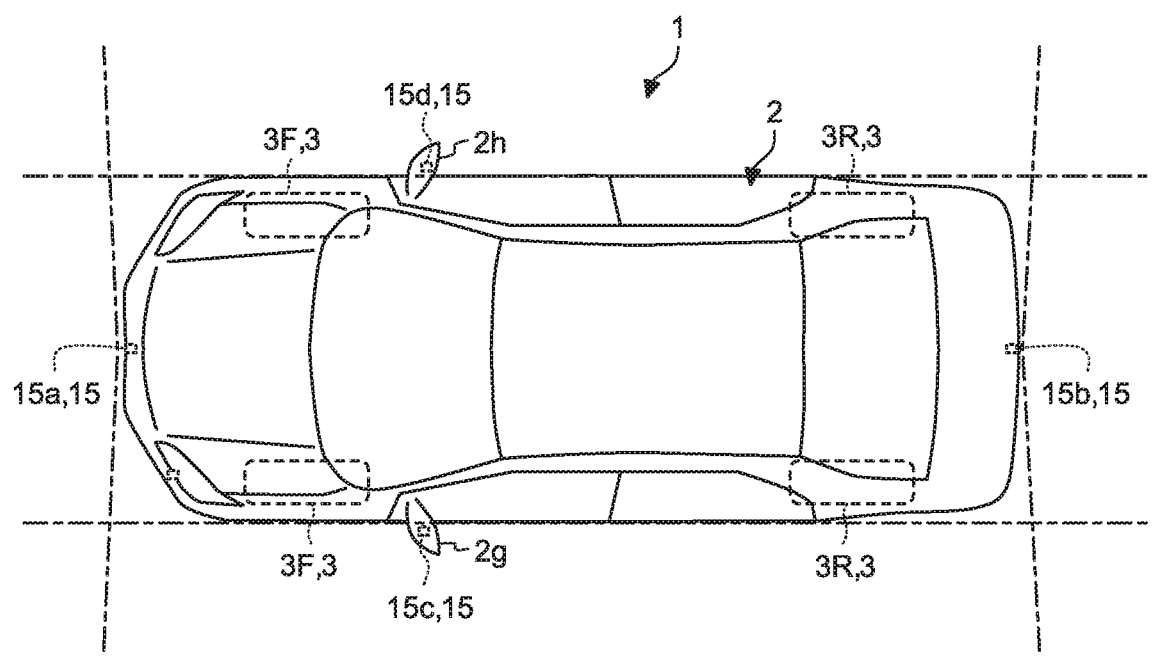
FIG. 2 is an exemplary plan view of the vehicle.

FIG. 2 is an exemplary plan view of the vehicle 1. As illustrated in FIG. 1 and FIG. 2, the vehicle 1 is a four-wheeled vehicle and is provided with two left and right front wheels 3F and two left and right rear wheels 3R. All or a part of the four wheels 3 can be steered.

The vehicle 1 includes a plurality of image capturing units 15. Each of the image capturing unit 15 is a digital camera provided with a built-in imaging element such as a charge coupled device (CCD), or a CMOS image sensor (CIS). Each of the image capturing unit 15 is capable of outputting, as data of an image, the data of a moving image including a plurality of frame images generated at a certain frame rate, or the data of a still image. For example, each image capturing unit 15 generates, as a captured image, a still image in which the periphery of the vehicle 1 is captured, and outputs data of the captured image. The captured image may be a moving image or a still image. Each image capturing unit 15 is provided with a wide-angle lens or a fish-eye lens and is capable of photographing a range of 140° to 190° in the horizontal direction. The optical axis of the image capturing unit 15 is oriented obliquely downward. Accordingly, the image capturing units 15 output data of the captured images in which an external environment on the periphery of the vehicle 1 are captured, where periphery of the vehicle 1 includes a road surface on which the vehicle 1 can move.

In the first embodiment, four image capturing units 15a, 15b, 15c, and 15d are provided on the vehicle 1. The vehicle 1 may have three or less or five or more plural image capturing units 15. The image capturing unit 15a is provided at a central portion of the front portion of the vehicle 1, for example. The image capturing unit 15a photographs the peripheral environment in front of the vehicle 1. The image capturing unit 15b is provided at a central portion of the rear portion of the vehicle 1, for example. The image capturing unit 15b photographs the peripheral environment behind the vehicle 1. The image capturing unit 15c is provided at the end portion of the left-hand side of the vehicle body 2, for example, on a left-side door mirror 2g. The image capturing unit 15c photographs the peripheral environment of the left-hand side of the vehicle 1. The image capturing unit 15d is provided at the end portion of the right-hand side of the vehicle body 2, for example, on a right-side door mirror 2h. The image capturing unit 15d photographs the peripheral environment of the right-hand side of the vehicle 1.

Figure 3:
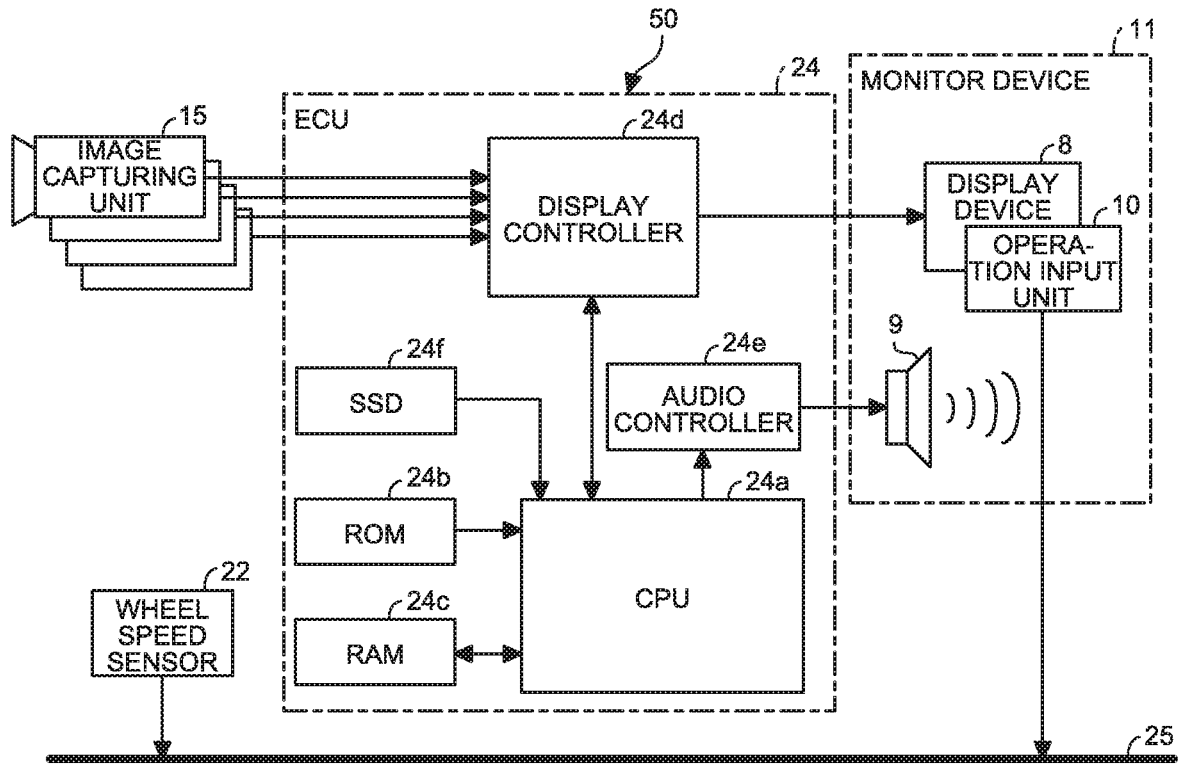
FIG. 3 is a block diagram for explaining a configuration of the vehicle.

FIG. 3 is a block diagram for explaining the configuration of the vehicle 1. As illustrated in FIG. 3, the vehicle 1 further includes a wheel speed sensor 22, an electronic control unit (ECU) 24, and an in-vehicle network 25. For example, the monitor device 11, the image capturing units 15, and the ECU 24 function as a periphery monitoring apparatus 50.

The wheel speed sensor 22 is a sensor that detects a rotation amount of the wheel 3 or a rotation speed thereof per unit time. The wheel speed sensor 22 outputs, as a sensor value, the number of wheel speed pulses representing the detected rotation speed. The wheel speed sensor 22 may be made up by using a hall element and the like.

The ECU 24 is a computer, for example. The ECU 24 receives captured image data from the image capturing unit 15. The ECU 24 transmits the data that concerns the image or the sound to be output to the monitor device 11. The ECU 24 includes a central processing unit (CPU) 24a, a read only memory (ROM) 24b, a random-access memory (RAM) 24c, a display controller 24d, an audio controller 24e, and a solid-state drive (SSD) 24f. The CPU 24a, the ROM 24b, and the RAM 24c may be integrated in the same package.

The CPU 24a reads out programs stored in a non-volatile storage device, such as the ROM 24b, and executes various arithmetic processes and control in accordance with the relevant programs. The CPU 24a executes image processing of images and the like for periphery monitoring displayed on the display device 8.

The ROM 24b stores the respective programs, parameters needed for executing the programs, and the like. The RAM 24c temporarily stores various data used in the calculation in the CPU 24a. The display controller 24d mainly executes, out of the arithmetic processes in the ECU 24, image processing of the image obtained by the image capturing unit 15, data conversion of display images to be displayed on the display device 8, and the like. The audio controller 24e mainly executes, out of the arithmetic processes in the ECU 24, processing of sound to be output to the sound output device 9. The SSD 24f is a rewritable non-volatile storage unit and it retains data even when the power supply of the ECU 24 is turned off.

In the first embodiment, the ECU 24 administers overall control of the vehicle 1 by the collaboration of hardware and software (a control program). For example, the ECU 24 calculates a travel distance of the vehicle 1, a vehicle speed thereof, and the like on the basis of the sensor value acquired from the wheel speed sensor 22, and executes various control. The ECU 24 generates a display image including a peripheral image on the basis of the captured image including the peripheral image captured by the image capturing unit 15, and causes the display device 8 to display the display image. Accordingly, the ECU 24 is implemented as the function of the periphery monitoring apparatus 50.

The in-vehicle network 25 is a controller area network (CAN), for example. The in-vehicle network 25 electrically connects the ECU 24, the operation input unit 10, and the wheel speed sensor 22 so that information such as a control signal and an operation signal can be transmitted and received among them.

Figure 4:
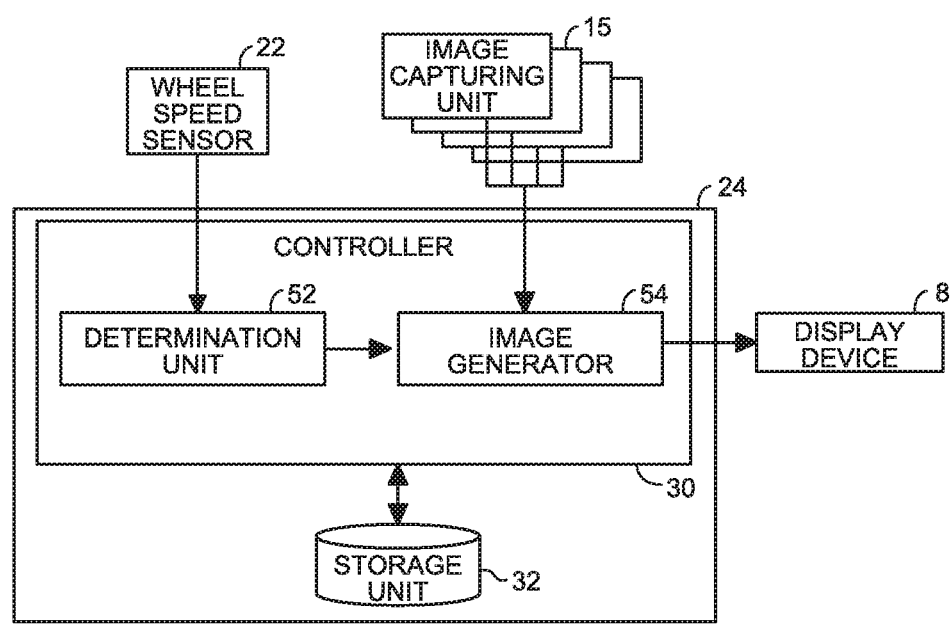
FIG. 4 is a block diagram illustrating functions of an ECU.

FIG. 4 is a block diagram illustrating the functions of the ECU 24. As illustrated in FIG. 4, the ECU 24 includes a controller 30 and a storage unit 32. The controller 30 is implemented as the functions of the CPU 24a, the display controller 24d, and the audio controller 24e. The storage unit 32 is implemented as the functions of the ROM 24b, the RAM 24c, and the SSD 24f.

The controller 30 generates, from the captured image, a peripheral image representing a view from a virtual viewpoint set at a relative position to the current position of the vehicle 1 depending on a movement of the vehicle 1. The controller 30 generates a display image in which a vehicle image (one example of a mobile body image) representing the position of the vehicle 1 is superimposed on the generated peripheral image. The controller 30 displays the vehicle image to fix a position of the vehicle image in the display image. The controller 30 includes a determination unit 52 and an image generator 54. The controller 30 functions as the determination unit 52 and the image generator 54 by reading a program for image display stored in the storage unit 32. Note that the whole or part of the determination unit 52 and the image generator 54 may be implemented by hardware such as a circuit including an application-specific integrated circuit (ASIC).

The determination unit 52 executes determination needed in image display. Specifically, the determination unit 52 determines whether or not to display the display image including the peripheral image. For example, the determination unit 52 determines whether or not to display the display image including the peripheral image according to the speed of the vehicle 1 (that is, a vehicle speed). The determination unit 52 may determine whether or not to display the display image including the peripheral image depending on other situations such as the shift position of the speed-change operating unit 7. The determination unit 52 further determines whether or not to update the display image including the peripheral image. For example, the determination unit 52 determines whether or not to update the display image according to a moving distance of the vehicle 1. Furthermore, the determination unit 52 determines whether or not to terminate the display of the display image including the peripheral image. For example, the determination unit 52 determines whether or not to terminate the display of the display image including the peripheral image depending on whether the vehicle 1 has stopped.

The image generator 54 generates the display image to be displayed on the display device 8. Specifically, the image generator 54 acquires a captured image captured by the image capturing unit 15. The image generator 54 generates, from the captured image, a peripheral image representing a view from a virtual viewpoint set at a relative position to the current position of the vehicle 1 depending on a movement of the vehicle 1. For example, the image generator 54 generates, as the peripheral image, an image representing a view of a captured image from the virtual viewpoint. The captured image has been projected onto a preset virtual projection plane. The image generator 54 may generate, as the peripheral image, an image equivalent to the image representing a view of the captured image from the virtual viewpoint projected onto the above-described virtual projection plane by using a graphics processing unit (GPU) or the like without generating an intermediate image that is obtained by projecting the captured image onto the virtual projection plane. The image generator 54 generates a display image by superimposing the vehicle image onto the generated peripheral image. Here, the image generator 54 fixes the position of the vehicle image in the display image. The vehicle image is stored in advance in the storage unit 32, for example. The image generator 54 causes the display device 8 to successively display the generated display image.

The storage unit 32 stores programs executed by the controller 30, data needed for executing the programs, and the like. For example, the storage unit 32 stores a program for image display. The storage unit 32 stores, as the data needed for executing the program for image display, a threshold vehicle speed for determining whether to display the display image including the peripheral image, the virtual projection plane onto which the captured image is projected, and data related to the vehicle image. The storage unit 32 may be a storage device or the like provided on a network (for example, a cloud).

Figure 5:
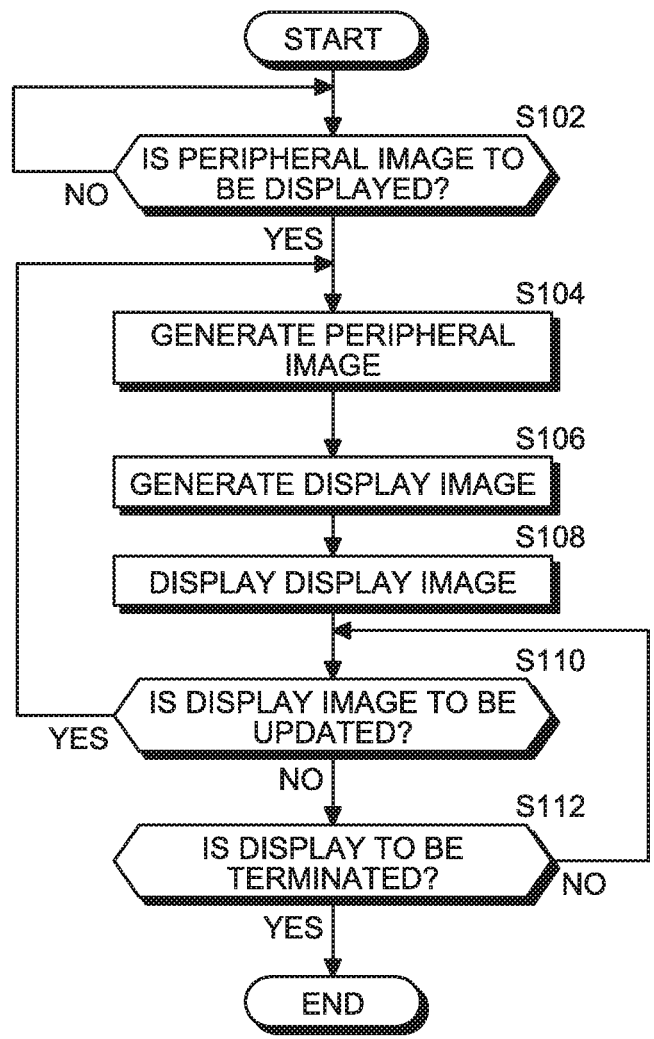
FIG. 5 is a flowchart of image display processing executed by a controller.

FIG. 5 is a flowchart of image display processing executed by the controller 30. The controller 30 functions, by reading the program for image display, as the determination unit 52 and the image generator 54 and executes the image display processing.

In the image display processing, the determination unit 52 of the controller 30 determines whether or not to display the display image including the peripheral image (S102). For example, the determination unit 52 determines whether or not to display the display image including the peripheral image depending on whether the vehicle speed calculated based on the sensor value acquired from the wheel speed sensor 22 is below the predetermined threshold vehicle speed. One example of the threshold vehicle speed is 10 km/h. In this case, when the vehicle speed is below the threshold vehicle speed, the determination unit 52 determines to display the display image including the peripheral image. On the other hand, when the vehicle speed is greater than or equal to the threshold vehicle speed, the determination unit 52 determines not to display the display image including the peripheral image. The determination unit 52 may determine whether or not to display the display image on the basis of an operation instruction by the occupant received via the operation input unit 10.

When it is determined not to display the display image including the peripheral image (No at S102), the determination unit 52 turns into a standby state. On the other hand, when it is determined to display the display image including the peripheral image (Yes at S102), the determination unit 52 outputs a display instruction to the image generator 54.

The image generator 54 generates the peripheral image upon acquiring the display instruction from the determination unit 52 (S104). For example, the image generator 54 acquires from the storage unit 32 a past captured image captured by the image capturing unit 15, and generates, as the peripheral image, an image representing a view of the past captured image from the virtual viewpoint. The past captured image has been projected onto the virtual projection plane.

Figure 6:
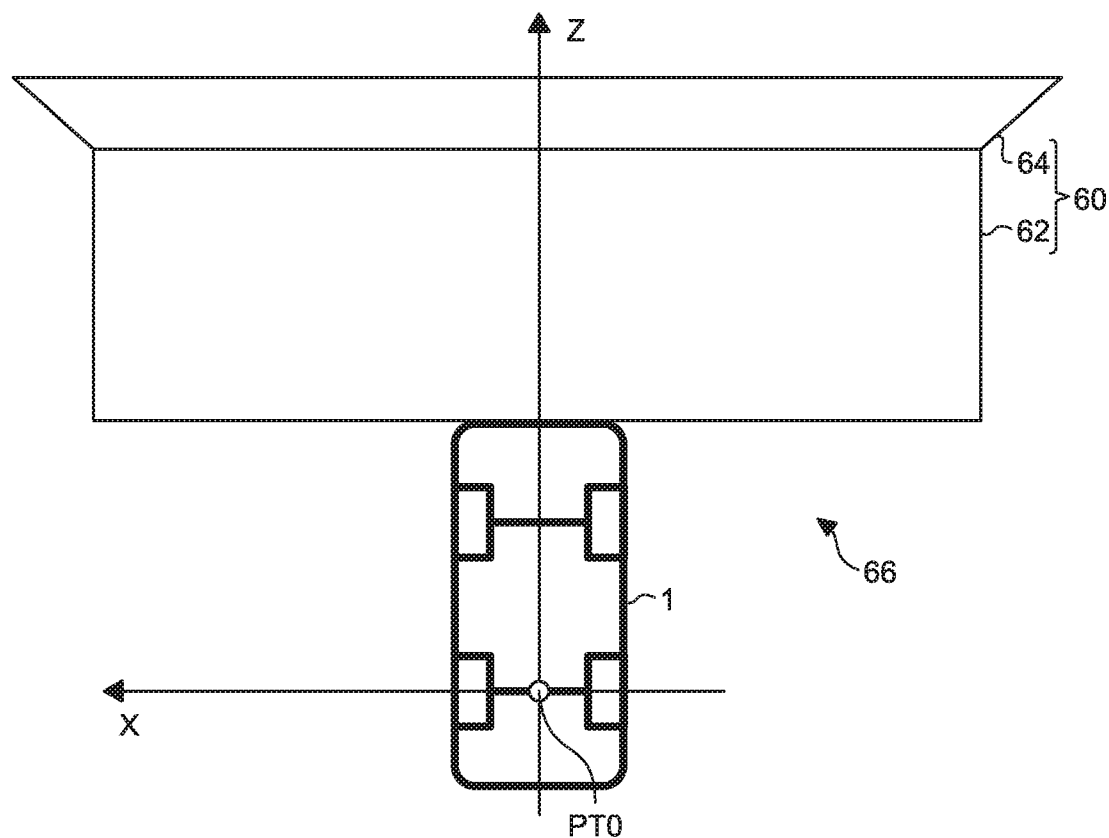
FIG. 6 is a diagram for explaining a virtual space including a projection plane on which a past captured image is projected.
Figure 7:
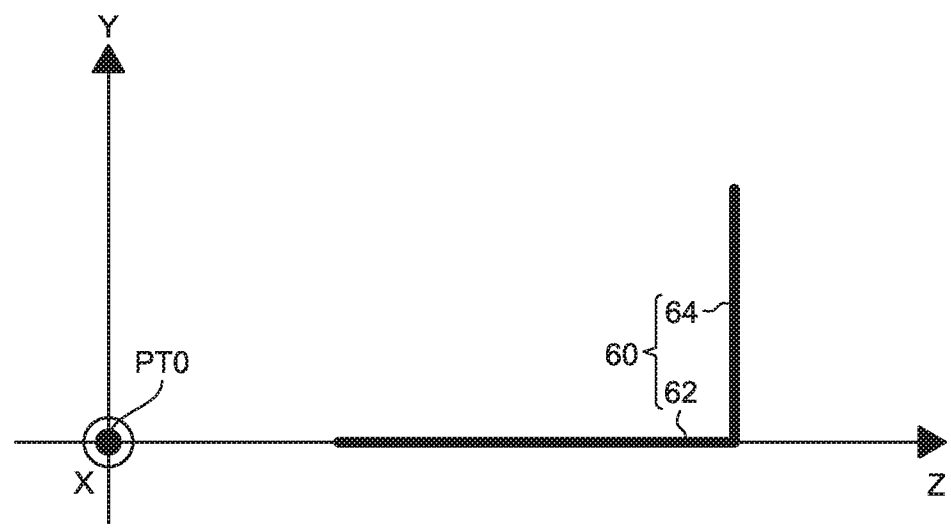
FIG. 7 is a side view of the virtual projection plane from a lateral side.

FIG. 6 is a diagram for explaining a virtual space 66 including a virtual projection plane 60 on which a past captured image is projected. FIG. 7 is a side view of the virtual projection plane 60 from a lateral side. The X and Z depicted with arrows in FIG. 6 are defined as an X direction and a Z direction. The Y depicted with an arrow in FIG. 7 is defined as a Y direction. FIG. 6 is a schematic plan view of the vehicle 1 and the periphery of the vehicle 1 in the virtual space 66.

The image generator 54 acquires, from the storage unit 32, a past captured image captured by the image capturing unit 15 of the vehicle 1 that was at an imaged position PT0 being a position of the vehicle 1 at the time when the past captured image was captured. The image generator 54 acquires information relating to the preset virtual projection plane 60 (for example, information such as the size and the position of the virtual projection plane 60) from the storage unit 32. The image generator 54 sets, in the three-dimensional virtual space 66 illustrated in FIG. 6, the three-dimensional virtual projection plane 60 on the moving direction side of the imaged position PT0 (for example, the front side). The virtual projection plane 60 includes a first virtual plane 62, and a second virtual plane 64 continuous with the first virtual plane 62. The first virtual plane 62 is parallel to an XZ plane (that is, the horizontal plane). The second virtual plane 64 is parallel to a YZ plane (that is, the vertical plane). That is, the second virtual plane 64 intersects with the first virtual plane 62. The end portion on the moving direction side of the first virtual plane 62 is coupled to the lower end portion of the second virtual plane 64. The image generator 54 generates, as the peripheral image, an image representing a view of the past captured image from the virtual viewpoint. The past captured image has been projected onto the three-dimensional virtual projection plane 60.

Figure 8:
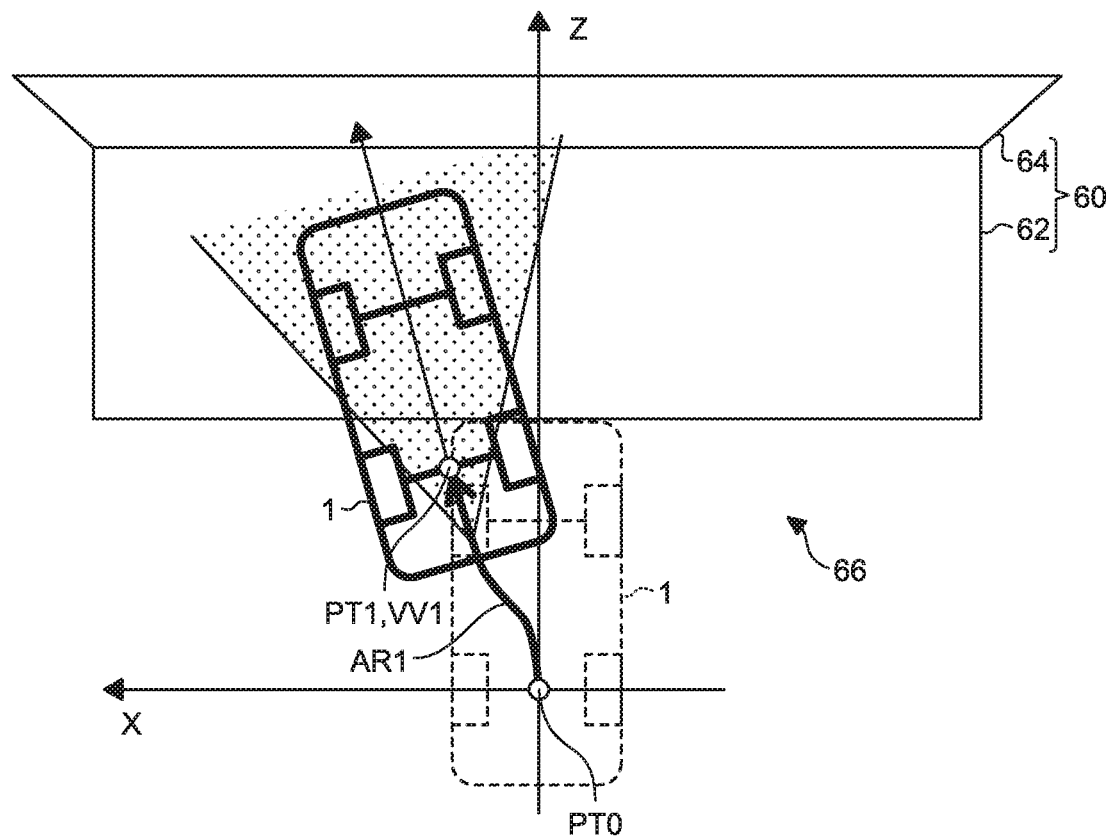
FIG. 8 is a diagram for explaining generation of a peripheral image by an image generator.

The generation of a peripheral image 72a by the image generator 54 will be specifically described. FIG. 8 is a diagram for explaining the generation of the peripheral image 72a by the image generator 54. FIG. 8 is a schematic plan view of the vehicle 1 and the periphery of the vehicle 1 in the virtual space 66 in a state where the vehicle 1 has moved from the imaged position PT0 in FIG. 6 to a virtual position PT1 along a bold arrow AR1. In FIG. 8, the vehicle 1 at the imaged position PT0 is depicted with a dotted line.

As illustrated in FIG. 8, the image generator 54 sets in the virtual space 66 the virtual position PT1 of the vehicle 1 corresponding to the current position of the vehicle 1 in the real space (for example, a world coordinate). The image generator 54 generates, as the peripheral image 72a, an image representing a view of the captured image from a virtual viewpoint VV1 that is set based on the virtual position PT1 of the vehicle 1. The captured image has been projected onto the virtual projection plane 60. The image generator 54 defines the virtual viewpoint VV1 as a starting point, and generates, as the peripheral image 72a, an image that is visible in an area within a predetermined angle (for example, a dotted area of FIG. 8) from the areas on both sides of a virtual line of vision defined as a direction along the moving direction (for example, the front) from the starting point. The image generator 54 may arbitrarily set the position of the virtual viewpoint VV1 according to the current position of the vehicle 1 or the virtual position PT1. The image generator 54 of the first embodiment fixes the relative position of the virtual viewpoint VV1 to the current position of the vehicle 1 or the virtual position PT1 and moves the position of the virtual viewpoint VV1 depending on a movement the vehicle 1. For example, the image generator 54 sets the position of the virtual viewpoint VV1 at 1 m rearward and 2 m high with respect to the central axis of the vehicle 1 in planar view. In the first embodiment, although the virtual viewpoint VV1 coincides with the virtual position PT1, the embodiment is not limited to this case.

The image generator 54 generates a display image by superimposing, on the generated peripheral image 72a, a vehicle image 74 being an image of the vehicle 1 (S106).

Figure 9:
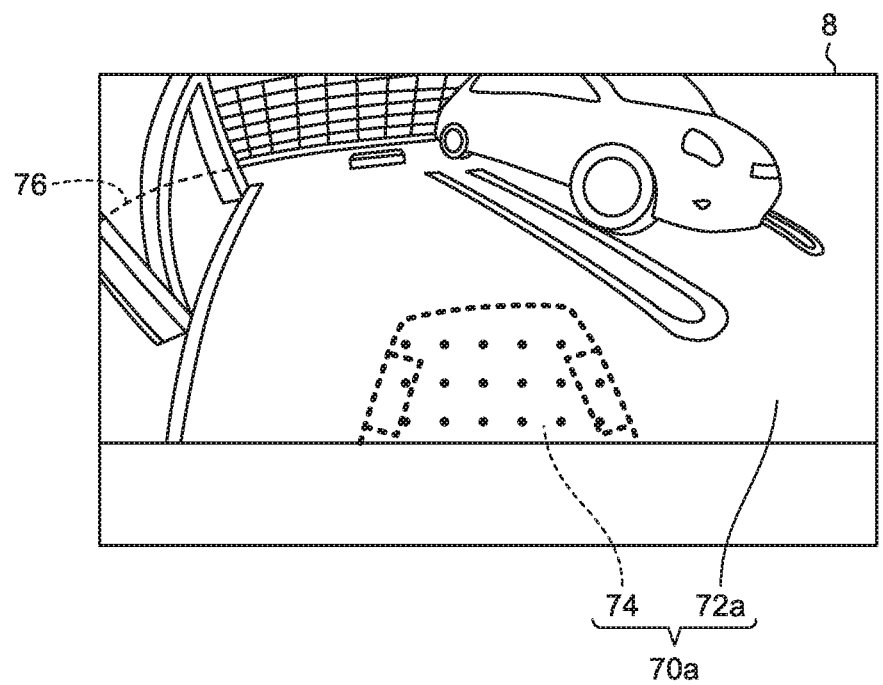
FIG. 9 is a diagram illustrating one example of a display image including the peripheral image generated by the image generator.

FIG. 9 is one example of a display image 70a including the peripheral image 72a generated by the image generator 54. The image generator 54 generates the display image 70a illustrated in FIG. 9 by superimposing the vehicle image 74, which is the image of the vehicle 1, onto the virtual position PT1 of the vehicle 1 in the generated peripheral image 72a. In FIG. 9, although the vehicle image 74 is illustrated with the dotted area and a frame of dotted line, the embodiment is not limited to this case. The image generator 54 may generate the display image 70a in which a horizontal line 76 is drawn onto the captured image projected onto the second virtual plane 64.

The image generator 54 causes the display device 8 to display the generated display image 70a illustrated in FIG. 9 (S108).

The determination unit 52 determines whether or not to update the display image 70a (S110). Specifically, the determination unit 52 calculates the moving distance of the vehicle 1 on the basis of the vehicle speed calculated by using the sensor value acquired from the wheel speed sensor 22. The determination unit 52 determines whether or not to update the display image 70a depending on whether the moving distance is greater than or equal to a predetermined threshold distance. When the moving distance is below the threshold distance, the determination unit 52 determines not to update the display image 70a. On the other hand, when the moving distance is greater than or equal to the threshold distance, the determination unit 52 determines to update the display image 70a.

When it is determined not to update the display image 70a (No at S110), the determination unit 52 determines whether or not to terminate the display of the display image 70a (S112). The determination unit 52 determines whether or not to terminate the display of the display image 70a on the basis of whether the vehicle 1 has stopped. When it is determined not to terminate the display of the display image 70a (No at S112), the determination unit 52 repeats the step S110.

When it is determined to update the display image 70a (Yes at S110), the determination unit 52 outputs an update instruction to the image generator 54.

Upon acquiring the update instruction, the image generator 54 generates a new peripheral image 72b by the above-described generation method of the display image 70a, and updates a display image 70b (S104, S106). The image generator 54 may change only the peripheral image by using a different captured image every time. Furthermore, the image generator 54 may update the display image 70b by generating, as the new peripheral image 72b, an image representing a view of the same captured image from a virtual viewpoint that is moved depending on a movement of the vehicle 1. The same captured image has been projected onto the virtual projection plane 60 of the same virtual space 66. In other words, the image generator 54 may generate the peripheral images 72a and 72b from a single captured image.

Figure 10:
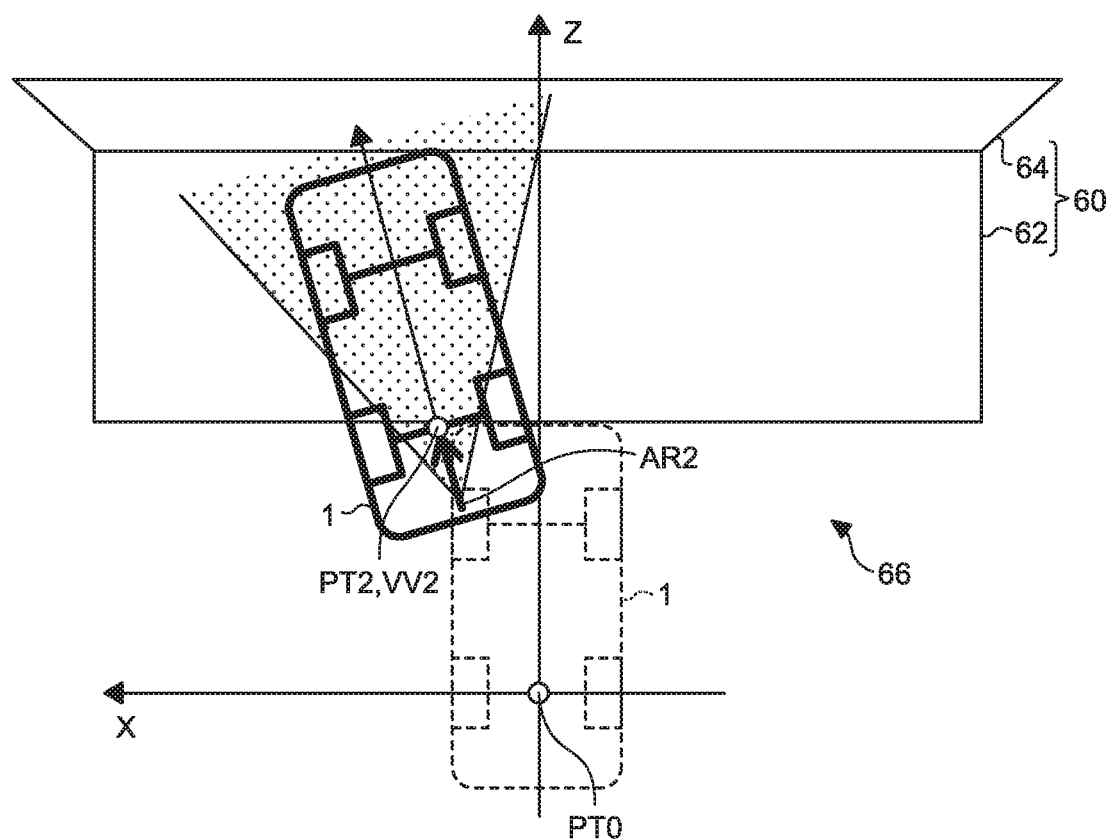
FIG. 10 is a diagram for explaining generation of the display image by the image generator in a state where the vehicle has moved from that in FIG. 8.
Figure 11:
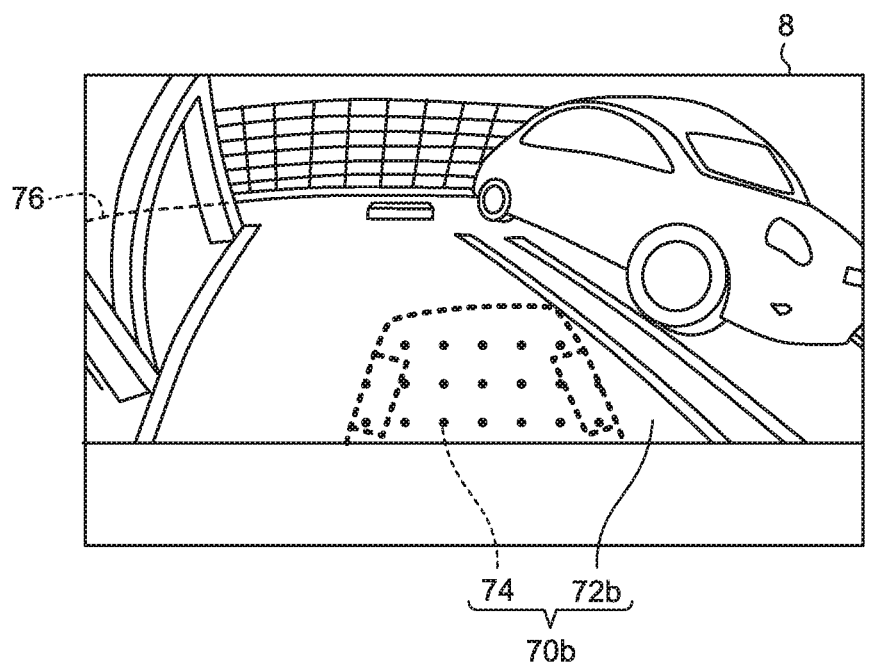
FIG. 11 is a diagram illustrating one example of the display image updated by the image generator.

The generation and updating of the display image 70b by the image generator 54 will be specifically described. FIG. 10 is a diagram for explaining the generation of the display image 70b by the image generator 54 in a state where the vehicle 1 has moved from that in FIG. 8. FIG. 11 is one example of the display image 70b updated by the image generator 54. In the following description, the display image 70a or 70b will be described as a display image 70 when there is no need to distinguish between them. Similarly, the peripheral image 72a or 72b will be described as a peripheral image 72 when there is no need to distinguish between them.

As illustrated in FIG. 10, even when the vehicle 1 has moved to a virtual position PT2 along an arrow AR2, the image generator 54 may generate, as the peripheral image 72b, an image representing a view of the same captured image from a virtual viewpoint VV2 which is moved based on the current position of the vehicle 1 that has moved. The same captured image has been projected onto the virtual projection plane 60 of the same virtual space 66. The image generator 54 generates and updates the display image 70b illustrated in FIG. 11 by superimposing the vehicle image 74 onto the position corresponding to the virtual position PT2 of the vehicle 1 in the generated peripheral image 72b. As illustrated in FIG. 11, the image generator 54 fixes the position of the vehicle image 74 without moving it in the display image 70b. Within a screen of the display device 8, on which the display images 70a and 70b illustrated in FIG. 9 and FIG. 11 are displayed, the position and the shape of the vehicle image 74 are the same. In other words, the image generator 54 changes the peripheral images 72a and 72b alone in the display images 70a and 70b.

The image generator 54 causes the display device 8 to display the updated display image 70b (S108). Accordingly, as long as the update instruction is acquired from the determination unit 52, the image generator 54 generates and updates the display image 70 in which the vehicle image 74 is fixed.

In the step S112, when it is determined to terminate the display of the display image 70 (Yes at S112), the determination unit 52 terminates the display of the display image 70 and ends the image display processing.

As described above, in the periphery monitoring apparatus 50, the controller 30 generates the display image 70 in which the position of the vehicle image 74 is fixed in the display image 70. As a result, the periphery monitoring apparatus 50 can provide the display image 70 that is easy for the occupant to watch because the position of the vehicle image 74 is maintained even when the peripheral image 72 is changed as the vehicle 1 has moved.

When the image generator 54 generates, from a single captured image projected onto the virtual projection plane 60, a plurality of peripheral images 72 representing a view from the moving virtual viewpoint VV, the periphery monitoring apparatus 50 can reduce a processing load of the controller 30 for generating the peripheral image 72.

In the periphery monitoring apparatus 50, the controller 30 generates, as the peripheral image 72, an image representing a view of the captured image from the virtual viewpoint VV, where the captured image has been projected onto the three-dimensional virtual projection plane 60 including the continuous first virtual plane 62 and the second virtual plane 64. As a result, in comparison with the case where the peripheral image is generated from a captured image projected onto a two-dimensional virtual projection plane, the periphery monitoring apparatus 50 can generate the peripheral image 72 that is easy for the occupant to watch. In particular, when an object extending in the vertical direction (for example, a utility pole) exists in the periphery of the vehicle 1, the image of the object two-dimensionally projected extends more than the actual object. On the other hand, by projecting the image on the virtual projection plane 60 having the second virtual plane 64, the controller 30 can suppress the extension of the image of the object and generate the peripheral image 72 that is easy to watch.

First Modification

Figure 12:
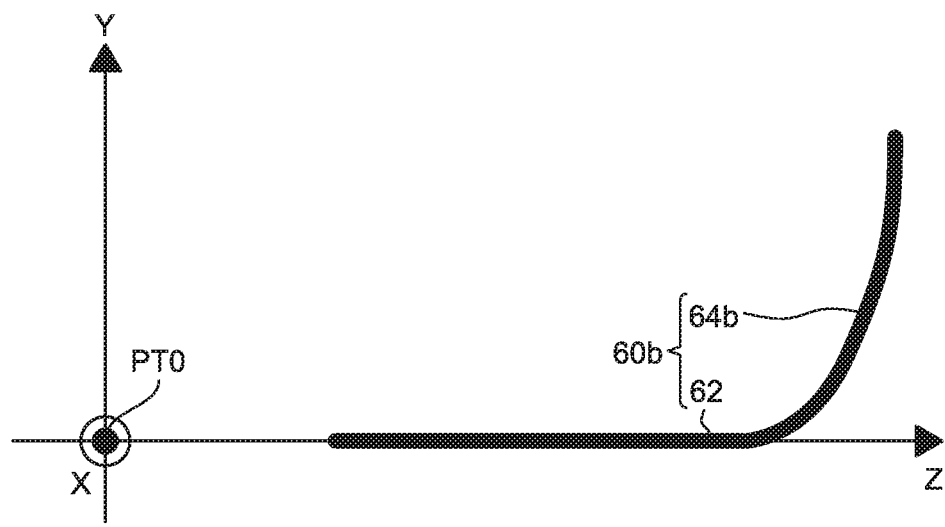
FIG. 12 is a side view of a virtual projection plane according to a first modification.

Next, a virtual projection plane 60b of a first modification where the virtual projection plane 60 of the above-described first embodiment is modified will be described. FIG. 12 is a side view of the virtual projection plane 60b according to the first modification. As illustrated in FIG. 12, the virtual projection plane 60b has a bowl shape and includes the first virtual plane 62 and a second virtual plane 64b. The second virtual plane 64b is formed in a curved surface shape bending in the vertical direction. For example, the second virtual plane 64b is formed in a curved surface shape projecting in the moving direction (+Z direction, in the example illustrated in FIG. 12). The lower end portion of the second virtual plane 64b is coupled to the end portion on the moving direction side of the first virtual plane 62. The controller 30 may generate, as a plurality of peripheral images, a plurality of images representing a view of captured image from a virtual viewpoint that is moved depending on a movement of the vehicle 1. The captured image has been projected onto the same virtual projection plane 60b.

Second Modification

Figure 13:
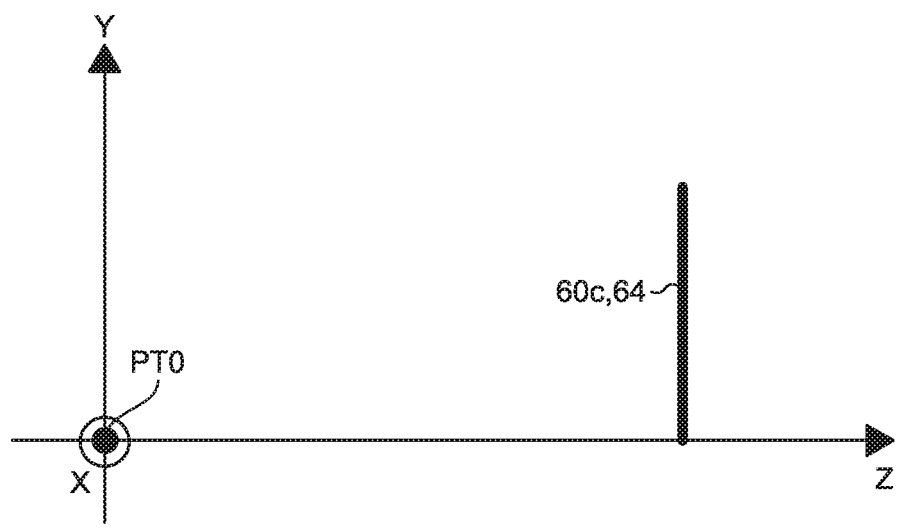
FIG. 13 is a side view of the virtual projection plane of the first modification.

Next, a virtual projection plane 60c of a second modification for which the virtual projection plane 60 of the above-described first embodiment is modified will be described. FIG. 13 is a side view of the virtual projection plane 60c according to the second modification. As illustrated in FIG. 13, the virtual projection plane 60c includes the second virtual plane 64. In other words, the virtual projection plane 60c has a configuration in which the first virtual plane 62 is omitted from the virtual projection plane 60 of the first embodiment. The controller 30 may generate, as a plurality of peripheral images, a plurality of images representing a view of captured image from a virtual viewpoint that is moved depending on a movement of the vehicle 1. The captured image has been projected onto the virtual projection plane 60c.

Second Embodiment

Figure 14:
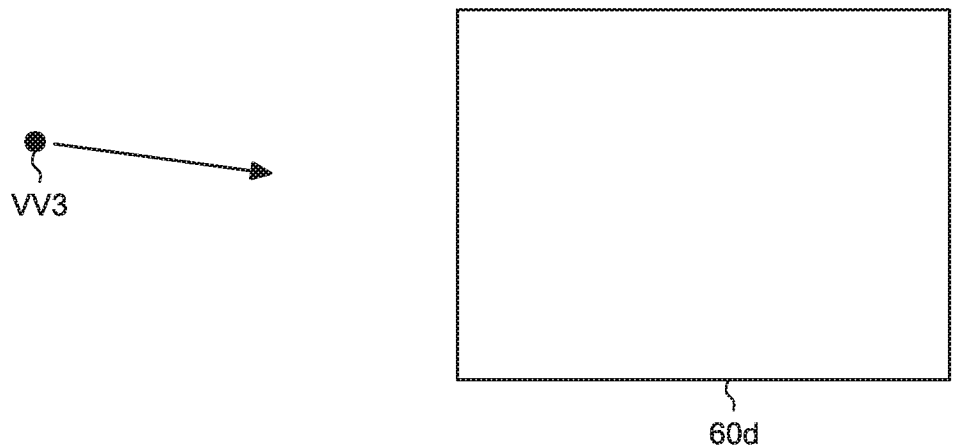
FIG. 14 is a diagram illustrating relation between a virtual viewpoint and a virtual projection plane according to a second embodiment.

The following describes a second embodiment in which the generation method of the peripheral image 72 is different from that of the first embodiment. FIG. 14 is a diagram illustrating relation between a virtual viewpoint and a virtual projection plane according to the second embodiment. The display image processing of the second embodiment will be described along the flowchart in FIG. 5.

As illustrated in FIG. 14, the image generator 54 of the controller 30 sets a virtual viewpoint VV3 on the basis of the current position of the vehicle 1. The image generator 54 sets a planar virtual projection plane 60d on the basis of the virtual viewpoint VV3. The image generator 54 generates, as the peripheral image 72, a viewpoint image in which a past captured image captured at the imaged position PT0 illustrated in FIG. 6 is projected onto the virtual projection plane 60d (S104). The image generator 54 generates and displays the display image 70 including the peripheral image 72 and the vehicle image 74 (S106, S108).

Thereafter, when updating the display image depending on a movement of the vehicle 1 (Yes at S110), by repeating the processing at and subsequent to the step S104 as illustrated in FIG. 5, the image generator 54 newly sets a virtual viewpoint and a virtual projection plane, and generates and updates the display image 70 from the same captured image. In other words, the image generator 54 generates, as a plurality of peripheral images 72, a plurality of viewpoint images generated by projecting the captured image onto a plurality of virtual projection planes 60d, . . . set on the basis of the respective virtual viewpoints VV3, . . . moved depending on the movement of the vehicle 1. Also in the second embodiment, the image generator 54 fixes the position of the vehicle image 74 in the display image.

The functions, the connection relations, the arrangements, the numbers, and others of the respective configurations of the above-described embodiments may be modified as appropriate. Furthermore, the respective embodiments or modifications may be combined.

For example, in the above-described embodiments, although the image generator 54 has set the position of the virtual viewpoints VV1, VV2, . . . as 1 m rearward and 2 m high with respect to the central axis of the vehicle 1 in planar view, the embodiments are not limited to this case. Although the image generator 54 sets the direction of the virtual line of vision having the starting point of the virtual viewpoints VV1, VV2, . . . as the moving direction of the vehicle 1, the embodiments are not limited to this case. For example, the image generator 54 may set the direction of the virtual line of vision having the starting point of the virtual viewpoints VV1, VV2, . . . as the direction of the image capturing unit 15 (for example, the optical axis direction of the lens of the image capturing unit 15). As a result, the controller 30 can reduce the discomfort felt by occupants who watch the above-described display image 70. In particular, when displaying by switching the peripheral image being captured by the image capturing unit 15 and the above-described display image 70, the controller 30 can further reduce the discomfort of the occupants because the viewpoint and the line of vision do not shift.

In the above-described embodiments, the example has been described, in which the image generator 54 generates the display image 70 including the peripheral image 72 generated from a captured image that is captured by a single image capturing unit 15. The embodiments are not limited to this case. For example, the image generator 54 may generate a display image including the peripheral image generated from a plurality of captured images that are captured by a plurality of image capturing units 15.

In the above-described embodiments, the example has been described, in which the display image 70 including the peripheral image 72 representing a view from the virtual viewpoint VV set by the image generator 54 is displayed. The embodiments are not limited to this case. For example, by receiving an instruction input by the user via the operation input unit 10 such as a touch panel, the image generator 54 may generate and display a display image including a peripheral image representing a view from a virtual viewpoint with the current position of the vehicle 1 as a reference. In this case, the image generator 54 may generate the display image including the peripheral image by moving the virtual viewpoint, which is a virtual viewpoint set with the current position of the vehicle 1 as a reference and is a virtual viewpoint looking at the direction of one gazing point, on the circumference in accordance with the input of the user, for example. Furthermore, the image generator 54 may generate a peripheral image representing a view from a virtual viewpoint that the user selected out of a plurality of virtual viewpoints set with the current position of the vehicle 1 as a reference. As a result, the image generator 54 can provide a display image including a peripheral image representing a view from the virtual viewpoint desired by the user.

In the above-described embodiments, although it has been described with the two-dimensional vehicle image 74 as an example, the embodiment is not limited to this case. For example, the image generator 54 may generate a vehicle image from a three-dimensional mobile body shape model stored in advance in the storage unit 32. The three-dimensional mobile body shape model is a three-dimensional shape model of the vehicle 1.

Figure 15:
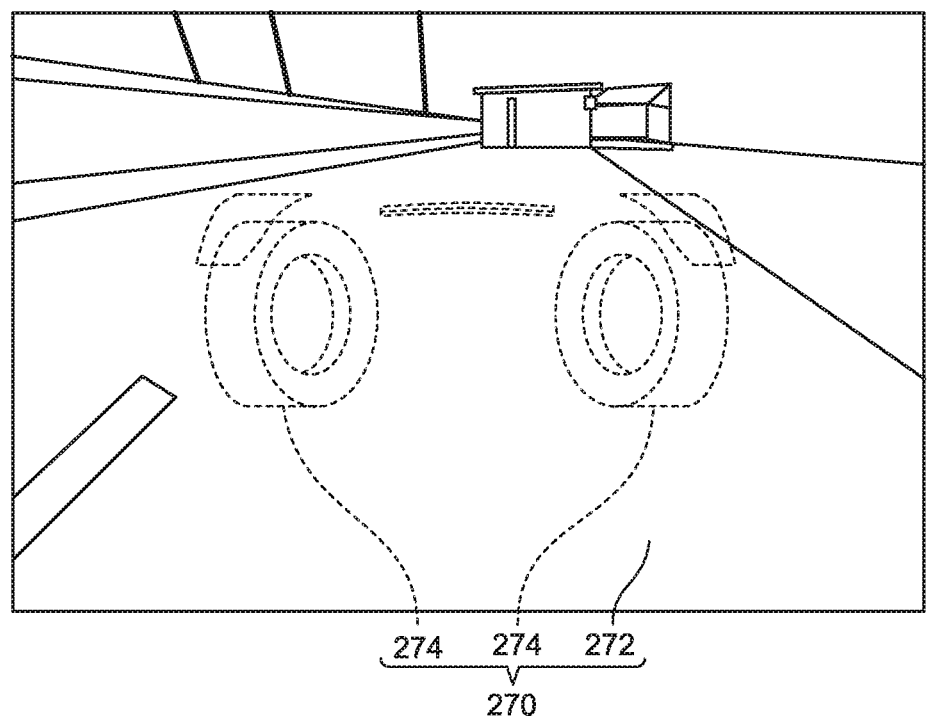
FIG. 15 is a diagram illustrating one example of a display image in which a three-dimensional vehicle image is superimposed on a peripheral image when the virtual viewpoint is set inside the vehicle.

FIG. 15 is one example of a display image 270 in which a three-dimensional vehicle image 274 is superimposed on a peripheral image 272 when the virtual viewpoint VV is set inside the vehicle 1. For example, as illustrated in FIG. 15, the image generator 54 may generate the display image 270 by setting the virtual viewpoint VV inside the vehicle 1, and superimposing the three-dimensional vehicle image 274 (see dotted lines) on the peripheral image 272 viewing the moving direction (for example, the front). As a result, the image generator 54 can provide the display image 270 that is more easily viewable.

Figure 16:
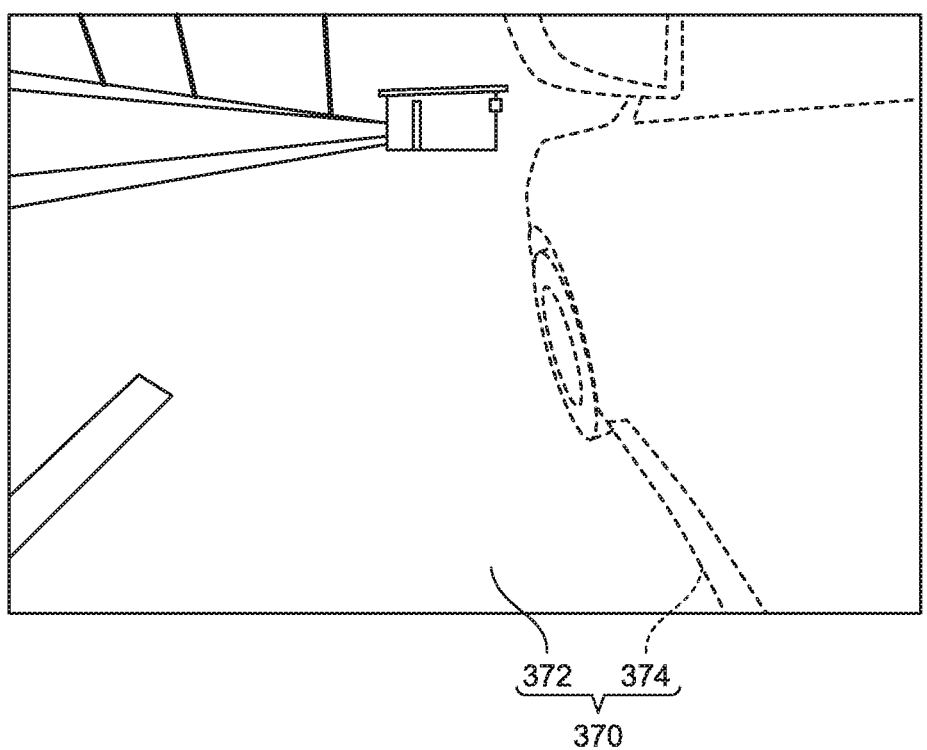
FIG. 16 is a diagram illustrating one example of a display image in which a three-dimensional vehicle image is superimposed on a peripheral image when the virtual viewpoint is set outside the vehicle.

FIG. 16 is one example of a display image 370 in which a three-dimensional vehicle image 374 is superimposed on a peripheral image 372 when the virtual viewpoint VV is set outside the vehicle 1. For example, as illustrated in FIG. 16, the image generator 54 may generate the display image 370 by setting the virtual viewpoint VV outside the vehicle 1 (for example, the left-hand side of the vehicle 1), and superimposing the three-dimensional vehicle image 374 (see dotted lines) on the peripheral image 372 viewing the moving direction (for example, the front). As a result, the image generator 54 can provide the display image 370 that is more easily viewable. Furthermore, by superimposing the vehicle image 274 or 374 semi-transparently, it makes it easy to grasp the positional relation between the vehicle image 274 or 374, and the objects photographed by the image capturing unit 15.

While the embodiments and the modifications of the present invention have been exemplified, these embodiments and the modifications described herein are presented as mere examples and are not intended to limit the scope of the invention. Those novel embodiments described herein may be embodied in various other forms, and various omissions, substitutions, and modifications can be made without departing from the scope of the invention. Those embodiments and the modifications thereof are included in the scope and spirit of the invention and are included in the scope of the invention stated in the appended claims and the scope of the equivalents thereof.

The invention claimed is:

1. A periphery monitoring apparatus comprising:
an image capturing unit configured to generate a captured image by capturing a periphery of a mobile body; and
a processor configured to implement:
a controller configured to
generate, from the captured image, a peripheral image representing a view from a virtual viewpoint that is set at a relative position to a current position of the mobile body depending on a movement of the mobile body,
generate a display image in which a mobile body image representing a position of the mobile body is superimposed on the peripheral image
display the display image on a display device, and
update the display image according to a moving distance of the mobile body,
wherein that the controller is further configured to
carry out the generation of the peripheral image by projecting a past captured image onto a preset virtual projection plane, wherein the past captured image has been captured by the image capturing unit in the past at an imaged position that is different from the current position,
carry out the update of the display image by:
generating a new peripheral image based on a new current position of the mobile body, and
generating an updated display image by superimposing the mobile body image of the display image onto the new peripheral image without changing a position of the mobile body image within a screen of the display device.

2. The periphery monitoring apparatus according to claim 1, wherein the controller generates, as the peripheral image, an image representing a view of the captured image from the virtual point, the captured image being projected onto a three-dimensional virtual projection plane including a first virtual plane and a second virtual plane intersecting with the first virtual plane.

3. The periphery monitoring apparatus according to claim 1, wherein the controller moves the virtual viewpoint in accordance with an input from a user.

4. The periphery monitoring apparatus according to claim 1, further comprising a storage unit configured to store a three-dimensional mobile body shape model that is a three-dimensional shape model of the mobile body,
wherein the mobile body image is generated from the three-dimensional mobile body shape model stored in advance in the storage unit.

5. The periphery monitoring apparatus according to claim 1, wherein the controller generates, as the peripheral image, an image representing a view of the captured image from the virtual point, the captured image being projected onto a three-dimensional virtual projection plane including a first two-dimensional virtual plane and a second two-dimensional virtual plane intersecting with the first virtual plane.

6. A periphery monitoring method comprising:
generating a captured image by capturing a periphery of a mobile body;
generating, from the captured image, a peripheral image representing a view from a virtual viewpoint that is set at a relative position to a current position of the mobile body depending on a movement of the mobile body;
generating a display image in which a mobile body image representing a position of the mobile body is superimposed on the peripheral image;
displaying the display image on a display device,
update the display image according to a moving distance of the mobile body,
carry out the generation of the peripheral image by projecting a past captured image onto a preset virtual projection plane, wherein the past captured image has been captured by the image capturing unit in the past at an imaged position that is different from the current position,
carry out the update of the display image by:
generating a new peripheral image based on a new current position of the mobile body, and
generating an updated display image by superimposing the mobile body image of the display image onto the new peripheral image without changing a position of the mobile body image within a screen of the display device.

7. The periphery monitoring method according to claim 6, wherein the generating a peripheral image includes generating, as the peripheral image, an image representing a view of the captured image from the virtual point, the captured image being projected onto a three-dimensional virtual projection plane including a first virtual plane and a second virtual plane intersecting with the first virtual plane.

8. The periphery monitoring method according to claim 6, further comprising moving the virtual viewpoint in accordance with an input from a user.

9. The periphery monitoring method according to claim 6, further comprising storing, in a memory, a three-dimensional mobile body shape model that is a three-dimensional shape model of the mobile body,
wherein the mobile body image is generated from the three-dimensional mobile body shape model stored in advance in the memory.

10. The periphery monitoring method according to claim 6, wherein the generating a peripheral image includes generating, as the peripheral image, an image representing a view of the captured image from the virtual point, the captured image being projected onto a three-dimensional virtual projection plane including a first two-dimensional virtual plane and a second two-dimensional virtual plane intersecting with the first virtual plane.

11. A non-transitory computer readable recording medium on which an executable program is recorded, the program comprising instructions which cause a computer to execute:

generating a captured image by capturing a periphery of a mobile body;

generating, from the captured image, a peripheral image representing a view from a virtual viewpoint that is set at a relative position to a current position of the mobile body depending on a movement of the mobile body;

generating a display image in which a mobile body image representing a position of the mobile body is superimposed on the peripheral image;

displaying the display image on a display device, and update the display image according to a moving distance of the mobile body, wherein that the controller is further configured to carry out the generation of the peripheral image by projecting a past captured image onto a preset virtual projection plane, wherein the past captured image has been captured by the image capturing unit in the past at an imaged position that is different from the current position, carry out the update of the display image by:

generating a new peripheral image based on a new current position of the mobile body, and generating an updated display image by superimposing the mobile body image of the display image onto the new peripheral image without changing a position of the mobile body image within a screen of the display device.

12. The non-transitory computer readable recording medium according to claim 11, wherein the generating a peripheral image includes generating, as the peripheral image, an image representing a view of the captured image from the virtual point, the captured image being projected onto a three-dimensional virtual projection plane including a first two-dimensional virtual plane and a second two-dimensional virtual plane intersecting with the first virtual plane.

* * * * *